US012800992B2

(12) United States Patent
Ushio et al.

(10) Patent No.: US 12,800,992 B2
(45) Date of Patent: Nov. 17, 2026

(54) BLADE OPEN-CLOSE DEVICE AND ELECTRONIC DEVICE

(71) Applicant: NIDEC PRECISION CORPORATION, Tokyo (JP)

(72) Inventors: Ryosuke Ushio, Tokyo (JP); Kenzo Imai, Tokyo (JP); Yuhei Shimohigashi, Tokyo (JP); Nobuaki Watanabe, Tokyo (JP)

(73) Assignee: NIDEC PRECISION CORPORATION, Tokyo (JP)

( * ) Notice: Subject to any disclaimer, the term of this patent is extended or adjusted under 35 U.S.C. 154(b) by 267 days.

(21) Appl. No.: 18/642,687

(22) Filed: Apr. 22, 2024

(65) Prior Publication Data

US 2024/0361668 A1 Oct. 31, 2024

(30) Foreign Application Priority Data

Apr. 26, 2023 (JP) ................................ 2023-072490

(51) Int. Cl.
*G03B 11/04* (2021.01)

(52) U.S. Cl.
CPC .................................. *G03B 11/045* (2013.01)

(58) Field of Classification Search
None
See application file for complete search history.

(56) References Cited

U.S. PATENT DOCUMENTS

| | | | | |
|---|---|---|---|---|
| 7,114,862 | B2 | 10/2006 | Huang | |
| 11,226,466 | B2 * | 1/2022 | Wang | G02B 7/023 |
| 11,378,867 | B2 | 7/2022 | Hung | |
| 11,977,318 | B2 * | 5/2024 | Lin | G03B 11/043 |
| 2008/0013262 | A1 * | 1/2008 | Stanford | G06F 1/1686 361/829 |
| 2022/0091478 | A1 * | 3/2022 | Sawanobori | G03B 11/043 |
| 2022/0091479 | A1 * | 3/2022 | Sawanobori | G03B 11/043 |
| 2023/0208057 | A1 * | 6/2023 | Han | H04M 1/0264 439/65 |
| 2023/0236477 | A1 * | 7/2023 | Su | G02B 7/02 396/483 |
| 2025/0013123 | A1 * | 1/2025 | Ushio | G03B 9/26 |

* cited by examiner

*Primary Examiner* — Rodney E Fuller
(74) *Attorney, Agent, or Firm* — HAUPTMAN HAM, LLP

(57) ABSTRACT

A blade open-close device includes an aperture blade having an opening on an optical axis of a lens and extending in an intersecting direction intersecting with a direction in which the optical axis of the lens extends, a blade on the aperture blade to be movable in the intersecting direction to open and close the opening, a drive that moves the blade to one of a closed position to close the opening or an open position to open the opening, a body to which the aperture blade, the blade, and the drive are attached, and a mount to which the body is attached in a detachable manner.

5 Claims, 9 Drawing Sheets

BLADE OPEN-CLOSE DEVICE AND ELECTRONIC DEVICE

RELATED APPLICATIONS

The present application claims priority to Japanese Application Number 2023-072490, filed Apr. 26, 2023, the disclosure of which is hereby incorporated by reference herein in its entirety.

BACKGROUND

Technical Field

The present invention relates to a blade open-close device and an electronic device.

Description of the Background

Known lens modules include shutter modules. Patent Literature 1 describes a lens module including a shutter module including a body, an actuator, a shutter blade, a fastened blade, and a cover at positions closer to a subject than an imaging lens.

CITATION LIST

Patent Literature

Patent Literature 1: U.S. Patent Application Publication No. 2006/0029385

BRIEF SUMMARY

However, the shutter module described in Patent Literature 1 is fastened to the imaging lens included in the lens module. This complicates the process of assembling and reassembling the shutter module.

A blade open-close device according to one embodiment includes an elongated member having an opening on an optical axis of an optical unit and extending in an intersecting direction intersecting with a direction in which the optical axis of the optical unit extends, a blade on the elongated member to be movable in the intersecting direction to open and close the opening, a drive that moves the blade to one of a closed position to close the opening or an open position to open the opening, a body to which the elongated member, the blade, and the drive are attached, and a mount to which the body is attached in a detachable manner.

An electronic device according to another embodiment includes the above blade open-close device, and a substrate to which the mount included in the blade open-close device is fastened.

The structure according to the above aspects of the present invention simplifies the process for assembling and reassembling the body.

DETAILED DESCRIPTION

A blade open-close device and an electronic device including the blade open-close device according to one or more embodiments of the present invention will now be described in detail with reference to the drawings.

First Embodiment

Electronic Device

Figure 1:
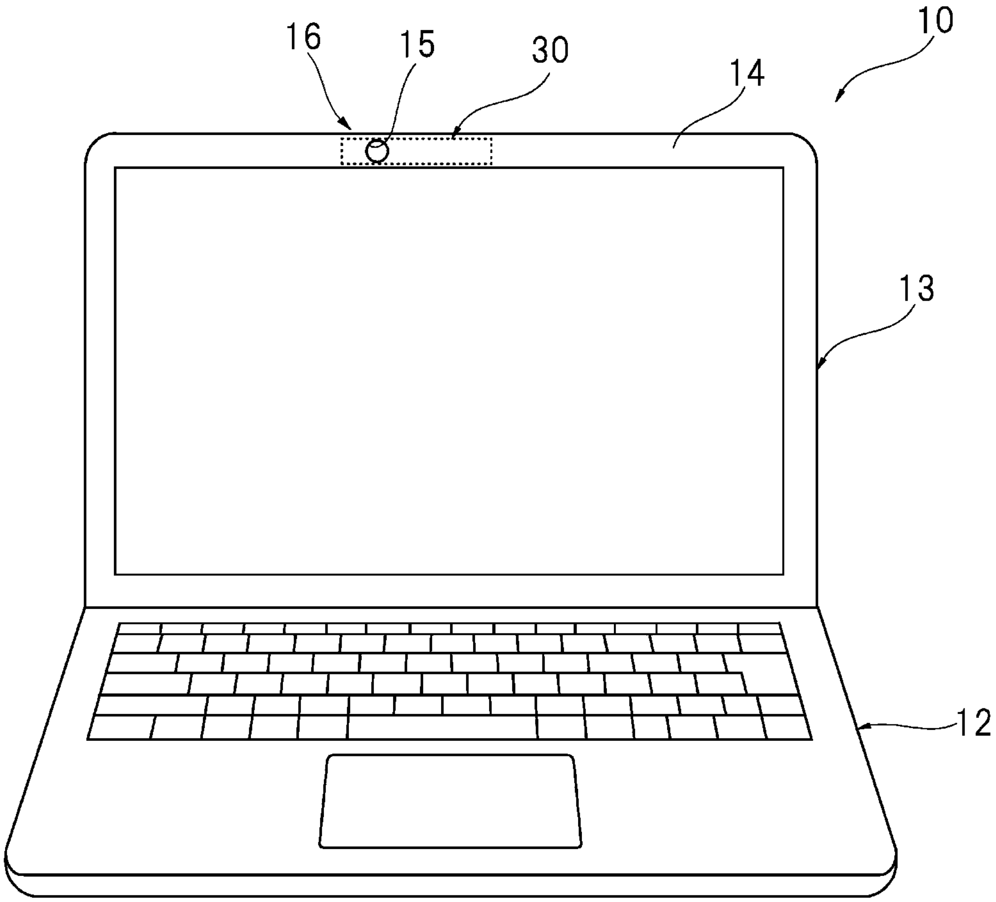
FIG. 1 is a schematic diagram of a laptop personal computer incorporating a blade open-close device according to an embodiment.

FIG. 1 shows the appearance of a laptop personal computer (PC) 10 as an example of an electronic device. The laptop PC 10 includes an input unit 12 for an input operation, such as a keyboard, and a display 13 for displaying information. The display 13 includes a frame 14. The frame 14 has a hole 15. The frame 14 also incorporates a camera unit 16 and a blade open-close device 30 (described in detail later). More specifically, the laptop PC 10 includes the blade open-close device 30. The blade open-close device 30 is attached to the camera unit 16 and thus is incorporated in the laptop PC 10. This laptop PC 10 has the camera function.

An electronic device including the blade open-close device 30 is not limited to the laptop PC 10, but may be any other electronic device with the camera function, such as a smart speaker or a home security camera.

Camera Unit

Figure 2:
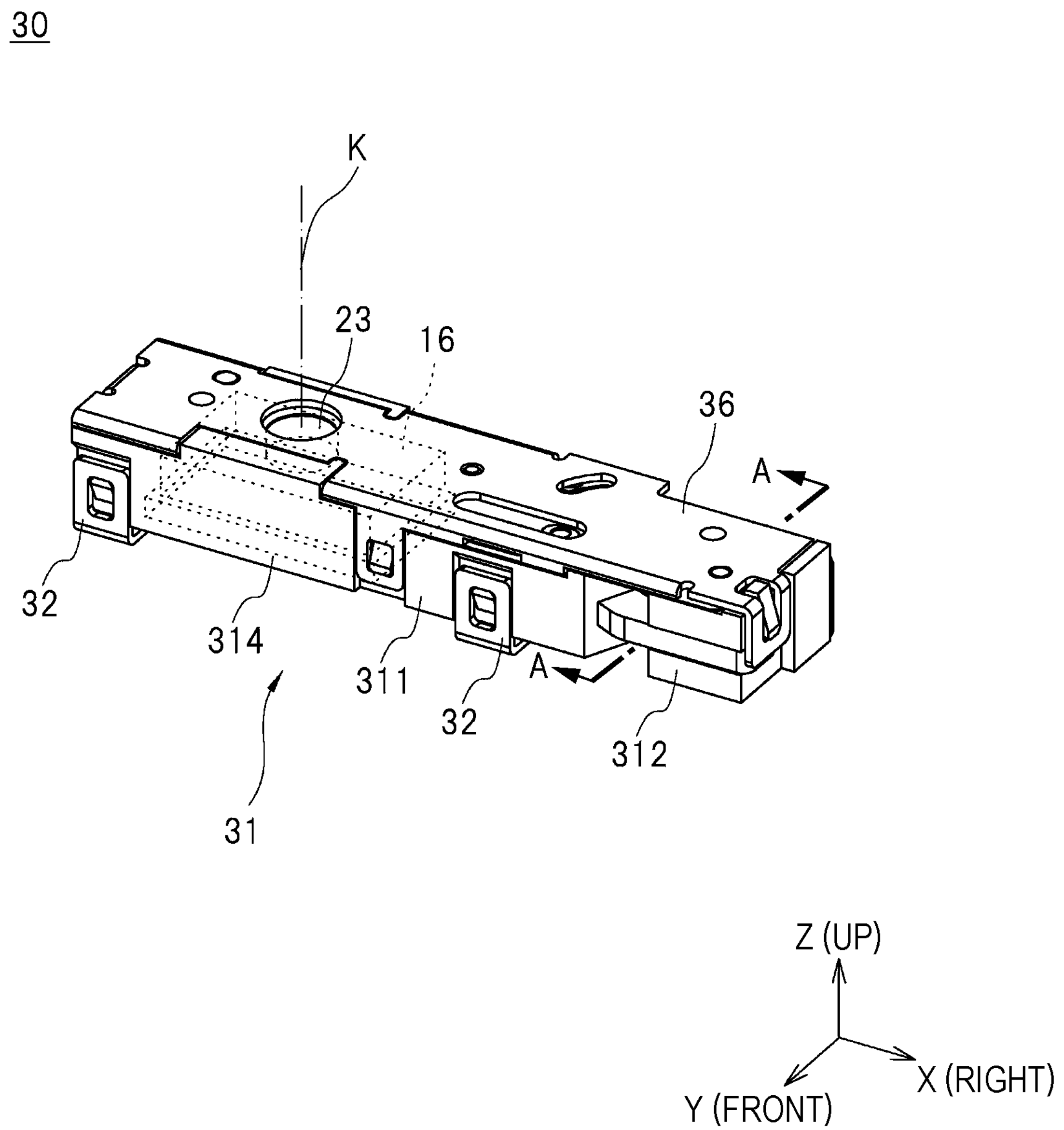
FIG. 2 is an external perspective view of a blade open-close device according to a first embodiment.

FIG. 2 is an external perspective view of the blade open-close device 30 included in the laptop PC 10. The camera unit 16 included in the laptop PC 10 is accommodated in the blade open-close device 30. The camera unit 16 includes a lens 23. The lens 23 is attached to the frame 14 in alignment with the hole 15 shown in FIG. 1. The lens 23 has an optical axis K. Arrow Z indicates the direction in which the optical axis K extends as an optical axis direction. External light enters the lens 23 from the tip toward the base of arrow Z.

Blade Open-Close Device 30

Figure 3:
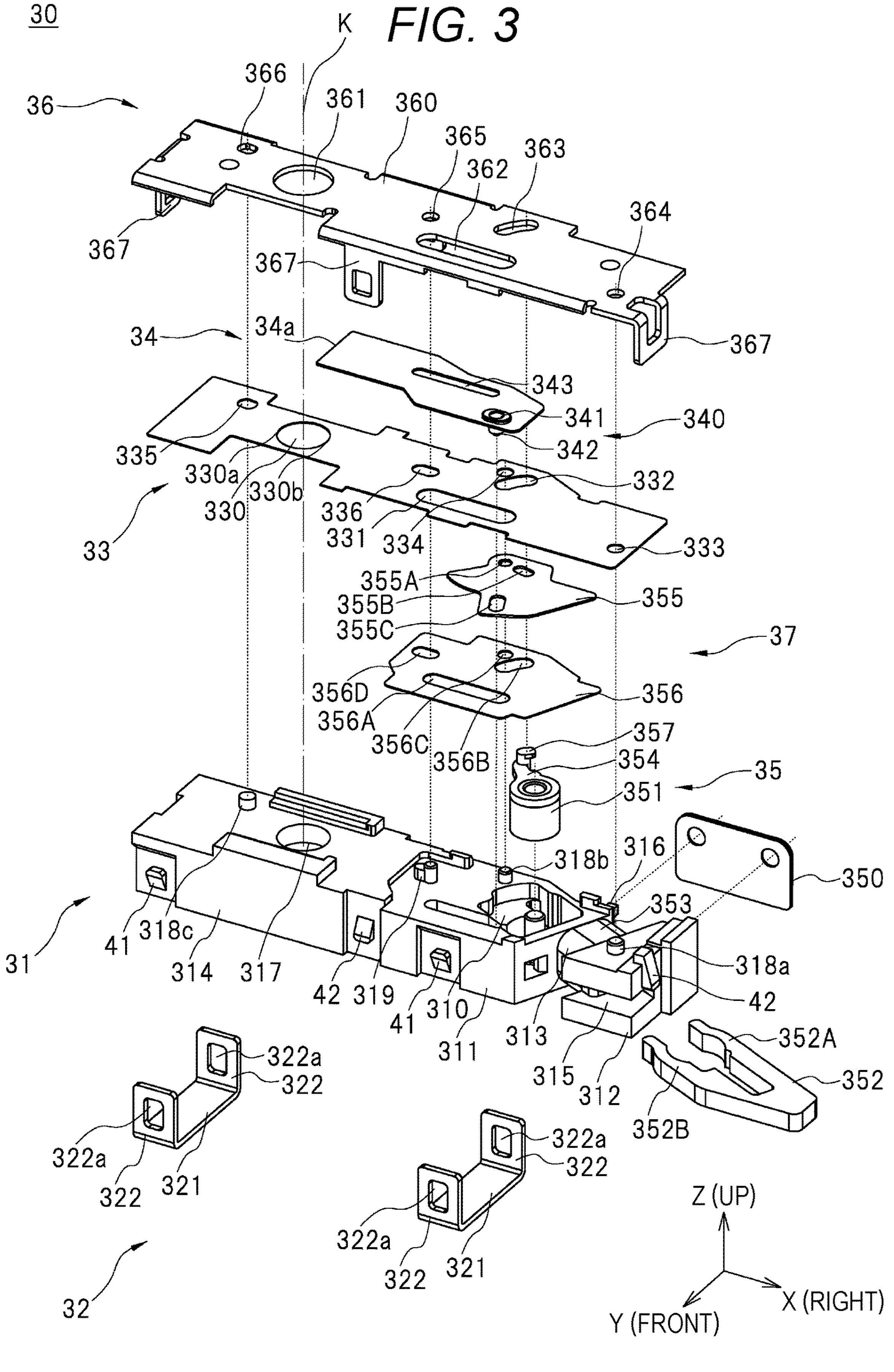
FIG. 3 is an exploded perspective view of the blade open-close device according to the first embodiment.

FIG. 3 is an exploded perspective view of the blade open-close device 30. The blade open-close device 30 extends in the direction indicated by arrow X. The direction indicated by arrow X is perpendicular to arrow Z, which is an optical axis K direction, and is an example of an intersecting direction intersecting with the optical axis K direction. Thus, the intersecting direction corresponds to the longitudinal direction of the blade open-close device 30 as viewed in the optical axis K direction. Arrow Y indicates the direction perpendicular to the direction indicated by arrow X (intersecting direction) and arrow Z (optical axis K direction). The direction indicated by arrow Y corresponds to the lateral direction when the blade open-close device 30 is viewed in the optical axis K direction.

The positive Z-direction may be hereafter referred to as being upward, and the negative Z-direction as being downward. The positive X-direction may be hereafter referred to as being rightward, and the negative X-direction as being leftward. The positive Y-direction may be hereafter referred to as being frontward, and the negative Y-direction as being rearward.

The blade open-close device 30 includes a body 31, mounts 32, an aperture blade 33, a blade 34, a drive 35, a cover 36, and a transmission member 37.

Body 31

The aperture blade 33, the blade 34, the drive 35, the cover 36, and the transmission member 37 (all of which will be described in detail later) are attached to the body 31. The body 31 is rectangular and has a length in the intersecting direction longer than the length in the front-rear direction intersecting with the optical axis K direction and the intersecting direction as viewed in the optical axis K direction.

The body 31 includes a first body 311, a second body 312, a connector 313, and a camera housing 314. The first body 311 is located leftward from the second body 312. The connector 313 is located between the first body 311 and the second body 312. The connector 313 connects to the first body 311 on the left and connects to the second body 312 on the right. The camera housing 314 is adjacent to the left end of the first body 311. The first body 311, the second body 312, the connector 313, and the camera housing 314 may be integral or separate from one another.

Bosses 318*a*, 318*b*, and 318*c* and a guide pin 319 are located on an upper surface of the body 31. More specifically, the boss 318*a* is located on an upper surface of the second body 312. The boss 318*b* and the guide pin 319 are located on an upper surface of the first body 311. The boss 318*c* is located on an upper surface of the camera housing 314. The bosses 318*a*, 318*b*, 318*c* and the guide pin 319 are protrusions protruding upward.

The body 31 includes projections 41 on its front surface, or more specifically, on front surfaces of the first body 311 and the camera housing 314. Each projection 41 has a slope with its upper end protruding more frontward than its lower end. In other words, the projection 41 is a first protrusion protruding from the side surface of the body 31 in a direction intersecting with the optical axis K. The body 31 also includes, on its rear surface, projections (not shown) similar to the projections 41.

The body 31 includes projections 42 on its front surface and right surface, or more specifically, on the front surface of the camera housing 314 and on the right surface of the second body 312. The projection 42 on the camera housing 314 protrudes frontward. More specifically, this projection 42 has a slope with its lower end protruding more frontward than its upper end. The projection 42 on the second body 312 protrudes rightward. More specifically, this projection 42 has a slope with its lower end protruding more rightward than its upper end. The body 31 also includes projections (not shown) similar to the projections 42 on its rear surface and left surface, or more specifically, on the rear surface and the left surface of the camera housing 314.

The first body 311 defines a first housing 310. The first housing 310 is a recess on the upper surface of the first body 311. The first housing 310 accommodates a rotor magnet 351 and a part of a yoke 352 included in the drive 35 (described later). The second body 312 defines a second housing 315. The second housing 315 is a portion of the second body 312 cut in a direction perpendicular to or substantially perpendicular to the vertical direction. The second housing 315 accommodates the remaining part of the yoke 352 included in the drive 35 (described later).

A coil 353 included in the drive 35 (described later) is attached to the connector 313. More specifically, the connector 313 is a coil base around which the coil 353 is wound. The camera housing 314 is a recess on a lower surface of the body 31 and accommodates the camera unit 16. The camera housing 314 has an opening 317 in its upper surface. The opening 317 extends through the upper surface of the camera housing 314 in the optical axis K direction. The opening 317 has its center on the optical axis K of the lens 23.

Each of the first body 311 and the second body 312 includes, on its rear surface, a fastener 316 fastened to a terminal plate 350 connected to the drive 35 (described later). The fasteners 316 are rods protruding rearward from the rear surfaces of the first body 311 and the second body 312.

Mount 32

The mounts 32 are fastened inside the laptop PC 10 that is an electronic device. The body 31 is detachably attached to the mounts 32. The mounts 32 are two mounts, or specifically, the mount 32 below the first body 311 and the mount 32 below the camera housing 314 on the left of the body 31. The mounts 32 may not be limited to those at two positions. A single mount 32 may be used, or three or more mounts 32 may be used.

Each mount 32 includes a base 321 and engagement portions 322. The base 321 extends in the front-rear direction on a plane intersecting with (perpendicular to or substantially perpendicular to) the optical axis K (in Z-direction). The base 321 is fastened inside the laptop PC 10. The engagement portions 322 are located at the front end and the rear end of the base 321, respectively, and extend upward along the optical axis K. The engagement portions 322 are elastic members, such as leaf springs. Each engagement portion 322 is a rectangular frame with a mounting opening 322*a* inside as viewed in the front-rear direction. More specifically, the mounting openings 322*a* are located in the walls of the respective engagement portions 322 that are facing the front surface and the rear surface of the body 31. When the body 31 is attached to the mounts 32, the projections 41 on the body 31 are received in the mounting openings 322*a*.

To attach the body 31 to the mounts 32, the body 31 is pushed downward from above the mounts 32. Each engagement portion 322 slides on the slope on the corresponding projection 41 and is inclined outward, or away from the side surface of the body 31. When the body 31 is pushed further downward and the upper end of the projection 41 reaches below the upper wall of the mounting opening 322*a* in the engagement portion 322, the engagement portion 322 returns to extend in the vertical direction by an elastic force. This causes the projection 41 to be received in the mounting opening 322*a* in the corresponding engagement portion 322. When multiple projections 41 protruding from the front surface and the rear surface of the body 31 are received in the mounting openings 322*a* in the respective engagement portions 322, the engagement portions 322 and the projections 41 as the first protrusions engage with each other, causing the body 31 to be attached to the mounts 32. More specifically, the body 31 as well as the aperture blade 33, the blade 34, the drive 35, the cover 36, and the transmission member 37 that are attached to the body 31 are mounted inside the laptop PC 10.

To detach the body 31 from the mounts 32, each engagement portion 322 is inclined (deformed) away from the side surface of the body 31 and is thus disengaged from the corresponding projection 41. In this state, the body 31 is pulled upward to be detached from the mounts 32. More specifically, the body 31 as well as the aperture blade 33, the blade 34, the drive 35, the cover 36, and the transmission member 37 that are attached to the body 31 are detached from inside the laptop PC 10.

Aperture Blade 33

The aperture blade 33 is located on the body 31. The aperture blade 33 is a plate-like elongated member with a predetermined thickness in the optical axis K direction and extending in the left-right direction (intersecting direction). The length of the aperture blade 33 in the intersecting direction is equal to or substantially equal to the length of the body 31 in the intersecting direction.

The aperture blade 33 includes an opening 330, a first guide hole 331, a second guide hole 332, and mounting holes 333, 334, 335, and 336. The bosses 318*a*, 318*b*, and 318*c* are placed through the respective mounting holes 333, 334, and 335. The guide pin 319 is placed through the mounting hole 336.

The opening 330 extends through the aperture blade 33 in the optical axis K direction. The opening 330 is located above the lens 23 included in the camera unit 16. More specifically, the opening 330 has its center on the optical axis K of the lens 23 and at the center of the opening 317 in the camera housing 314. The opening 330 functions as a diaphragm (aperture) that determines the amount of light entering the lens 23.

The first guide hole 331 is linearly elongated in the intersecting direction as viewed in the optical axis K direction. The first guide hole 331 receives an insertion portion 342 on the blade 34 (described later). The first guide hole 331 guides the movement of the insertion portion 342 in the intersecting direction.

The second guide hole 332 is arc-shaped as viewed in the optical axis K direction. The second guide hole 332 receives a connector 357 in the drive 35 (described later). The second guide hole 332 guides the movement of the connector 357.

Blade 34

The blade 34 is a plate having a predetermined thickness in the optical axis direction. The blade 34 is rectangular and has a length in the intersecting direction longer than its length in the front-rear direction as viewed in the optical axis K direction. The blade 34 is located on the aperture blade 33 and is movable in the intersecting direction when driven by the drive 35 (described later). The blade 34 has its length in the intersecting direction shorter than the length of the aperture blade 33 in the intersecting direction. Thus, as the blade 34 moves, the opening 330 in the aperture blade 33 switches between an open state and a closed (shielded) state. More specifically, the blade 34 is movable in the intersecting direction on the aperture blade 33 as an elongated member to open and close the opening 330.

The blade 34 has a through-hole (not shown) adjacent to its right end. The through-hole receives an engagement member 340. The engagement member 340 includes a head 341 located upward from the blade 34, and the insertion portion 342 extending downward from the head 341 through the through-hole to be engageable with a second engagement hole 355C in a lever blade 355 (described later).

A guide hole 343 is located leftward and rearward from the engagement member 340. The guide hole 343 is a slot extending through the blade 34 in the optical axis K direction and is elongated in the intersecting direction. The guide pin 319 is placed through the guide hole 343.

The blade 34 with the above structure moves in the intersecting direction when driven by the drive 35 (described later). More specifically, when the blade 34 moves leftward and has a left end 34*a* at a position leftward from a left end 330*a* of the opening 330, the opening 330 is closed. The position of the blade 34 in this state may be referred to as a closed position. When the blade 34 is at the closed position, the blade 34 blocks light passing through the opening 330 and the opening 317 toward the lens 23. This prevents light from entering the lens 23.

When the blade 34 moves rightward and has the left end 34*a* at a position rightward from a right end 330*b* of the opening 330, the opening 330 is open. The position of the blade 34 in this state may be referred to as an open position. When the blade 34 is at the open position, external light enters the lens 23 through an opening 361 in the cover 36 (described below), the opening 330 in the aperture blade 33, and the opening 317 in the body 31. FIGS. 2 and 3 show the blade open-close device 30 with the blade 34 at the open position.

Cover 36

The cover 36 is located above the blade 34. More specifically, the cover 36 covers, from above, the camera unit 16 as well as the body 31, the aperture blade 33, the blade 34, and the drive 35 (described in detail later) that are included in the blade open-close device 30. The cover 36 includes an upper plate 360 defining an upper end portion of the blade open-close device 30. The upper plate 360 has a predetermined thickness in the optical axis direction and extends in the intersecting direction. The upper plate 360 has a rectangular outer shape with the length in the intersecting direction longer than its length in the front-rear direction as viewed in the optical axis direction. In other words, the cover 36 is a cover member that extends in the intersecting direction and covers the blade 34. As described above, the blade 34 is located on the aperture blade 33 and moves in the intersecting direction in the space defined by the cover 36 as a cover member and the aperture blade 33 as an elongated member. The upper plate 360 has its length in the intersecting direction longer than the length of the aperture blade 33 in the left-right direction.

The upper plate 360 has the opening 361, guide holes 362 and 363, and mounting holes 364, 365, and 366. The opening 361 extends through the upper plate 360 in the optical axis direction. The opening 361 has its center on the optical axis K of the lens 23. More specifically, the opening 361 is located above the opening 330 in the aperture blade 33 and the opening 317 in the camera housing 314. The boss 318*a* is placed through the mounting hole 364, the guide pin 319 is placed through the mounting hole 365, and the boss 318*c* is placed through the mounting hole 366.

The guide hole 362 is linearly elongated in the intersecting direction as viewed in the optical axis K direction. The guide hole 362 is located above the first guide hole 331 in the aperture blade 33 described above. The guide hole 362 guides the head 341 on the blade 34 described above in the intersecting direction. The guide hole 363 is arc-shaped as viewed in the optical axis K direction. The guide hole 363 is located above the second guide hole 332 in the aperture blade 33. The guide hole 362 guides the connector 357 included in the drive 35 (described later).

The upper plate 360 includes, on its front, rear, right, and left ends, engagement portions 367 extending downward. Each engagement portion 367 has a rectangular frame shape as viewed in the front-rear or in the left-right direction. The cover 36 is attached to the body 31 from above with the engagement portions 367 engaged with the corresponding projections 42 on the body 31. The engagement portion 367 on the rear end of the upper plate 360 is not shown in the figure.

Drive 35

The drive 35 moves the blade 34 to one of the closed position at which the opening 330 is closed or the open position at which the opening 330 is open. The drive 35 includes the rotor magnet 351, the yoke 352, and the coil 353.

The coil 353 is a winding wound around the connector 313 in the body 31 described above. More specifically, the connector 313 functions as a winding mount to which the coil 353 as a winding is attached. The coil 353 is electrically connected to the terminal plate 350. The terminal plate 350 is a flat plate attached to the fasteners 316 on the rear surface of the body 31 described above to be parallel to or substantially parallel to the rear surface of the body 31. The terminal plate 350 is electrically connected to a power supply (not shown).

Figure 4:
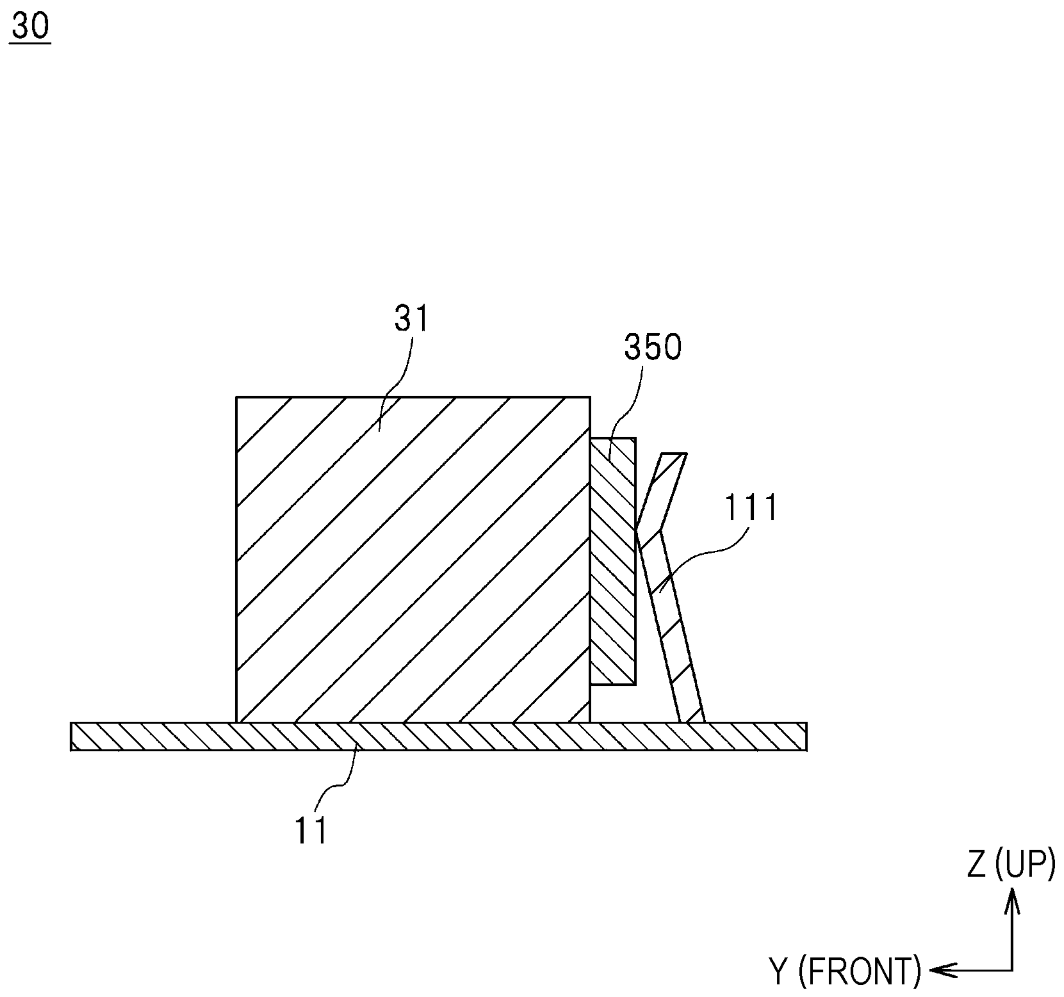
FIG. 4 is a schematic cross-sectional view of a body and a substrate electrically connected to the body.

FIG. 4 is a schematic cross-sectional view of the body 31 and a substrate 11 electrically connected to the body 31 taken along line A-A in FIG. 2. As shown in FIG. 4, a connection terminal 111 on the substrate 11 fastened to the laptop PC 10 comes in contact with the terminal plate 350. The connection terminal 111 electrically connects the drive 35 and the substrate 11. The connection terminal 111 is located on an upper surface of the substrate 11, or specifically, a surface to which the mounts 32 described above are fastened and on which the body 31 is mounted. The connection terminal 111 is a spring terminal formed from, for example, an elastic material and extends in the vertical direction. When the body 31 is attached to the mounts 32, a portion of the connection terminal 111, for example, an upper end portion of the connection terminal 111 comes in contact with the terminal plate 350. This electrically connects the drive 35 to a device external to the blade open-close device 30, allowing the coil 353 to be energized from the device external to the blade open-close device 30.

The yoke 352 shown in FIG. 3 is formed from a magnetic material and includes an arm 352A and an arm 352B. The arms 352A and 352B in the yoke 352 are accommodated in the first housing 310 in the body 31 described above, and the remaining portion of the yoke 352 is accommodated in the second housing 315. The arms 352A and 352B are magnetized to have different polarities as the coil 353 is energized.

The rotor magnet 351 is accommodated in the first housing 310 in the body 31 described above. The rotor magnet 351 accommodated in the first housing 310 is located between the arms 352A and 352B in the yoke 352. The rotor magnet 351 includes magnets with different magnetic poles in the circumferential direction. When the arms 352A and 352B are magnetized to have different polarities as the coil 353 is energized, a repulsive force or an attractive force acts on the magnets in the rotor magnet 351. Thus, the rotor magnet 351 is rotated as the coil 353 is energized. The direction of rotation of the rotor magnet 351 can be changed by changing the direction of the current flowing through the coil 353.

The first body 311 defining the first housing 310 in which the yoke 352 is accommodated is adjacent to the right end of the camera housing 314 in the intersecting direction. More specifically, the drive 35 is located adjacent to the camera unit 16 including the lens 23 in the intersecting direction.

A lever 354 is attached to an upper end of the rotor magnet 351. The lever 354 extends radially outward from the rotor magnet 351. The lever 354 includes the connector 357 being a hook.

Transmission Member 37

The transmission member 37 moves the blade 34 in the intersecting direction by transmitting a rotational drive force generated by the rotor magnet 351 rotating in the drive 35 to the blade 34. The transmission member 37 includes the lever blade 355 and a partition 356.

The partition 356 is located above the rotor magnet 351, or specifically, at an upper end of the first body 311 in the body 31. The partition 356 divides the space inside the first housing 310 defined in the first body 311 from the space in which the lever blade 355 is located. The partition 356 has guide holes 356A and 356B and through-holes 356C and 356D. The through-holes 356C and 356D are located below the respective mounting holes 334 and 336 in the aperture blade 33. The boss **318*b* is placed through the through-hole 356C. The guide pin 319 is placed through the through-hole 356**D.

The guide hole 356A is linearly elongated in the intersecting direction as viewed in the optical axis K direction. The guide hole 356A is located below the first guide hole 331 in the aperture blade 33. The insertion portion 342 on the blade 34 is placed through the guide hole 356A. The guide hole 356A guides the movement of the insertion portion 342 in the intersecting direction.

The guide hole 356B is arc-shaped as viewed in the optical axis K direction. The guide hole 356B is located below the second guide hole 332 in the aperture blade 33. The connector 357 described above is placed through the guide hole 356B. The guide hole 356B guides the movement of the connector 357.

The lever blade 355 is located above the partition 356. The lever blade 355 is a plate and has a shaft hole 355A, a first engagement hole 355B, and a second engagement hole 355C in its surface. The boss **318*b* is placed into the shaft hole 355A. This allows the lever blade 355 to rotate about the boss 318*b*. The connector 357 is placed through the first engagement hole 355B. The insertion portion 342 on the blade 34 is placed through the second engagement hole 355**C.

Operation

The driving of the blade 34 by the drive 35 and the transmission member 37 described above will now be described. With the blade 34 at the open position as shown in FIGS. 2 and 3, the rotor magnet 351 and the connector 357 rotate in the counterclockwise direction in FIG. 3. In this case, the lever blade 355 starts moving in the clockwise direction about the boss **318*b* in FIG. 3 through engagement of the edge of the first engagement hole 355B and the connector 357. This causes the edge of the second engagement hole 355C to engage with the insertion portion 342 on the blade 34, and causes the insertion portion 342 to move leftward. As the insertion portion 342 moves, the blade 34 including the insertion portion 342 is guided by the guide pin 319** and moves leftward in the intersecting direction.

In contrast, the rotor magnet 351 and the connector 357 rotate in the clockwise direction in FIG. 3 when the blade 34 is at the closed position. In this case, the lever blade 355 starts moving in the counterclockwise direction about the boss 318*b* in FIG. 3 through engagement of the edge of the first engagement hole 355B and the connector 357. This causes the edge of the second engagement hole 355C to engage with the insertion portion 342, and causes the insertion portion 342 to move rightward. As the insertion portion 342 moves, the blade 34 including the insertion portion 342 is guided by the guide pin 319 and moves rightward in the intersecting direction.

The first embodiment described above produces at least one of the advantageous effects described below.

(1) The blade open-close device 30 includes the body 31 to which the aperture blade 33, the blade 34, and the drive 35 are attached, and the mounts 32 to which the body 31 is attached in a detachable manner. The mounts 32 are fastened to the laptop PC 10 as an electronic device. This structure allows the blade open-close device 30 to be detached from the electronic device for inspection and repair when a failure or another defect occurs in the components in the blade open-close device 30, unlike the structure in which the body 31 is fixed to the electronic device by, for example, adhesion. Compared with the blade open-close device 30 being mounted in an electronic device with screws or an adhesive, the work involved in mounting the blade open-close device 30 in an electronic device can be simplified, thus reducing damage to parts during mounting.

(2) The blade open-close device 30 includes the connection terminal 111 electrically connected to the drive 35. The connection terminal 111 is formed from an elastic material. This allows electrical connection between an external device and the coil 353 in the drive 35 in the body 31 that is detachable.

(3) The body 31 includes the projections 41 as the first protrusions protruding from its side surfaces in the intersecting direction intersecting with the optical axis K. The body 31 is attached to the mounts 32 with the projections 41 received in the mounting openings 322*a* in the engagement portions 322 in the mounts 32 engaged with the engagement portions 322. This facilitates attachment and detachment of the body 31 in the blade open-close device 30, thus improving workability. This structure also does not use a large space to place the mount 32. This structure facilitates product miniaturization.

(4) The body 31 includes the connector 313 as a winding mount to which the coil 353 as a winding is attached, the first housing 310 accommodating the rotor magnet 351, and a second housing 315 accommodating the yoke 352. This allows the number of parts to be reduced, because the drive 35 can be directly accommodated in the body 31, compared with the structure in which a dedicated member (coil base) to accommodate the drive 35 is attached to the body 31 in which the blades 34 are located. This structure thus simplifies the assembly and reduces the manufacturing costs. In addition, the reduced number of parts facilitates detachment, thus improving the work efficiency during inspection and repair.

Second Embodiment

A blade open-close device according to a second embodiment will now be described. In the example described below, like reference numerals denote like components in the first embodiment, and the second embodiment will be described focusing on the differences from the first embodiment. Unless otherwise specified, the components are the same as in the first embodiment. The blade open-close device according to the second embodiment differs from the blade open-close device 30 according to the first embodiment in the structure of the mounts.

Figure 5A:
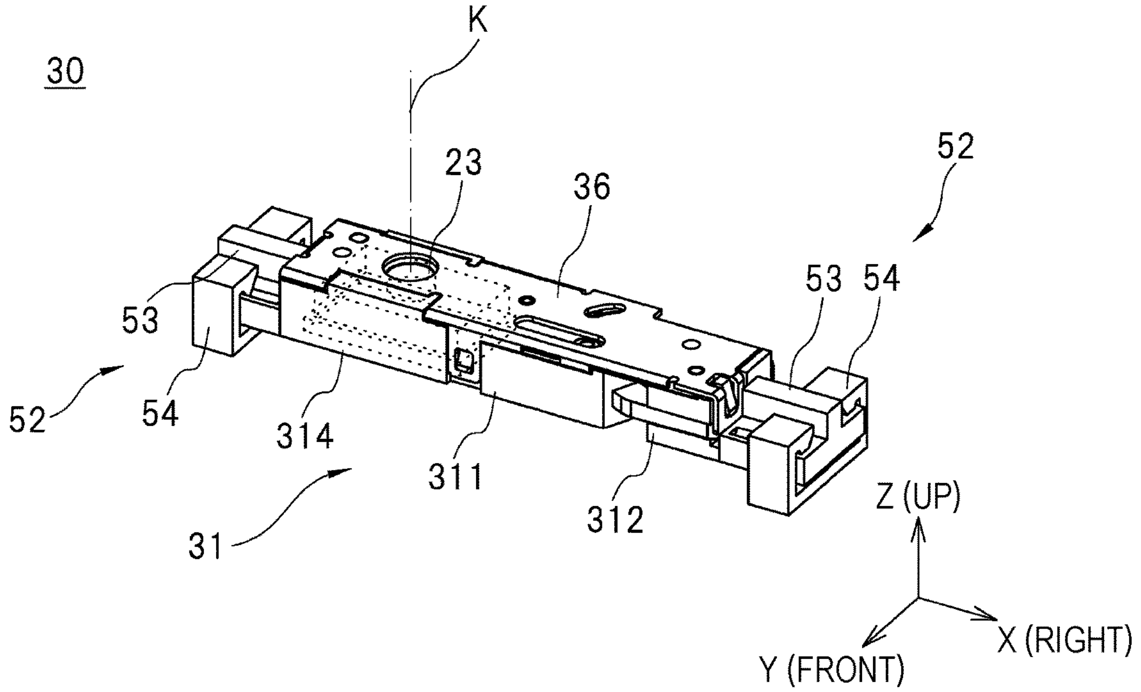
FIG. 5A is an external perspective view of a blade open-close device according to a second embodiment.
Figure 5B:
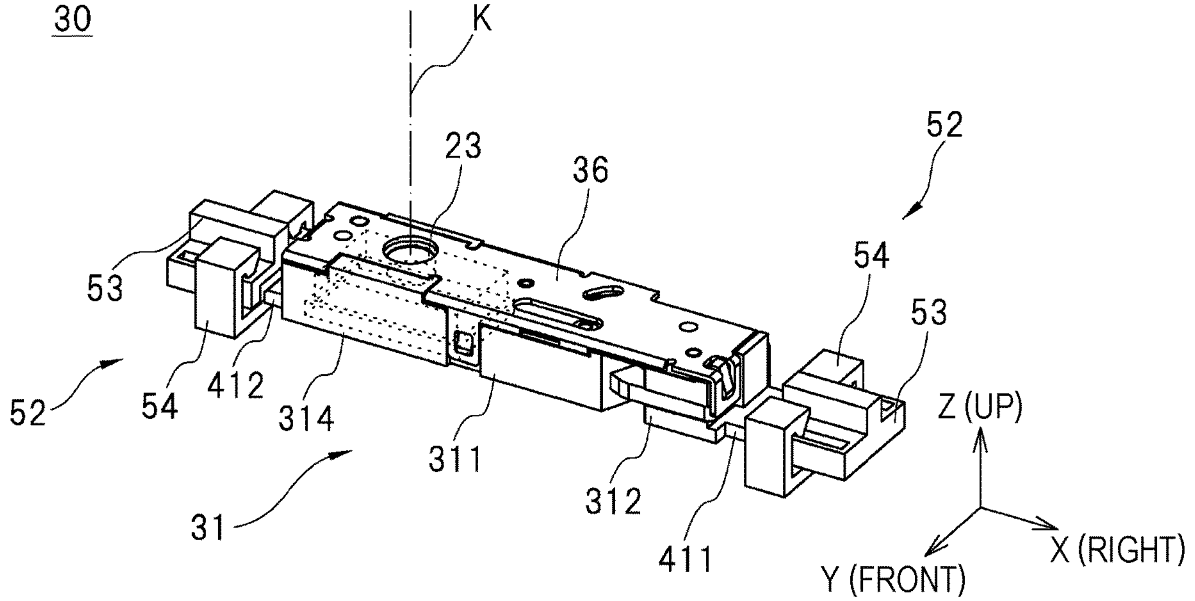
FIG. 5B is an external perspective view of the blade open-close device according to the second embodiment.

FIGS. 5A and 5B are external views of a blade open-close device 30 according to the second embodiment. The blade open-close device 30 according to the second embodiment includes mounts 52. A body 31 has the shape partly different from the shape of the body 31 in the first embodiment to allow attachment to the mounts 52 in a detachable manner.

Body 31

As shown in FIG. 5B, the body 31 includes, on its right surface, or more specifically, on its lower end of the right surface of the second body 312, a mounting projection 411 protruding rightward. The body 31 includes, on its left surface, or more specifically, on its lower end of the left surface of the camera housing 314, a mounting projection 412 protruding leftward. In other words, the mounting projections 411 and 412 on the body 31 are second protrusions protruding from the side surfaces of the body 31 in a direction intersecting with the optical axis K (intersecting direction). The body 31 in the second embodiment does not include the projections 41 included in the body 31 in the first embodiment.

Mount 52

The mount 52 are located on the right end and the left end of the body 31. Each mount 52 includes a movable attachment 53 that is movable relative to the laptop PC 10 and the body 31, and a support 54 that supports the movable attachment 53. The support 54 is fastened to the laptop PC 10. Thus, the movable attachment 53 is movable relative to the support 54.

Movable Attachment 53

Figure 6A:
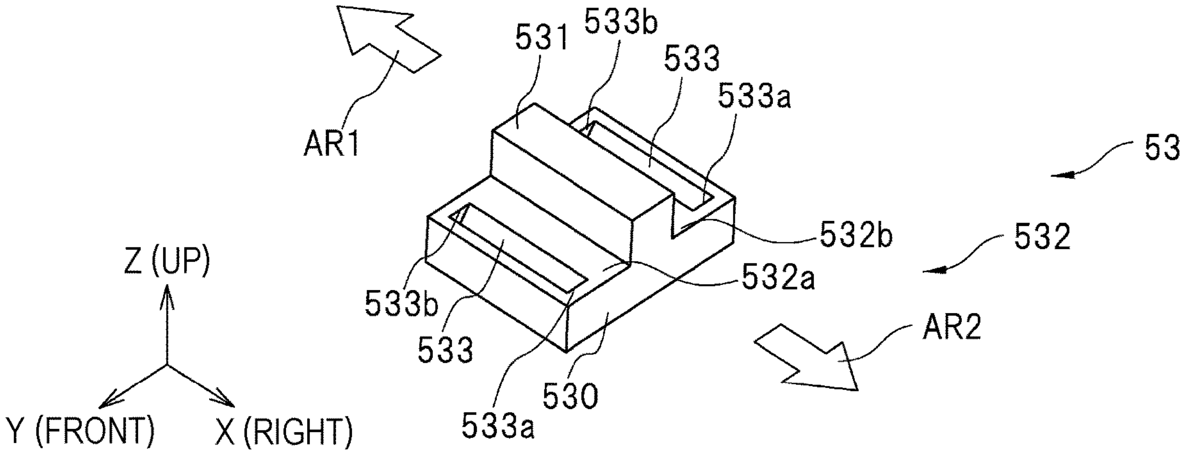
FIG. 6A is an external perspective view of a movable attachment.
Figure 6B:
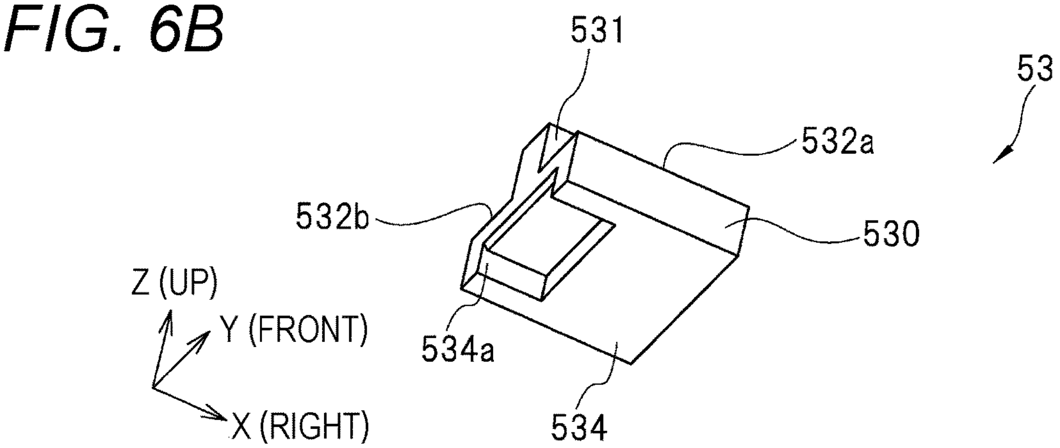
FIG. 6B is an external perspective view of the movable attachment as viewed from below.

FIG. 6A is an external perspective view of the movable attachment 53. FIG. 6B is an external view of the movable attachment 53 in the mount 52 on the right end of the body 31, as viewed from below. As shown in FIG. 6A, the movable attachment 53 includes a base 530 and a protrusion 531 on the base 530.

The base 530 is a rectangular member with a plane that intersects with the optical axis K, or more specifically, perpendicular to or substantially perpendicular to the optical axis K. The protrusion 531 is a rectangular column protruding upward from an upper surface 532 of the base 530 and extends in the left-right direction. The protrusion 531 is located close to the center of the upper surface 532 of the base 530 in the front-rear direction. In other words, the protrusion 531 divides the upper surface 532 of the base 530 into a frontward surface (front surface) 532*a* and a rearward surface (rear surface) 532*b*.

Each of the front surface 532*a* and the rear surface 532*b* has a groove 533 extending in the left-right direction. The groove 533 has a length in the left-right direction shorter than the length of the base 530 in the left-right direction. The groove 533 receives a portion of the support 54 (described later).

As shown in FIG. 6B, the base 530 has a mounting recess 534*a* in its lower surface 534 adjacent to the right surface of the body 31. More specifically, the mount 52 on the right end of the body 31 has the mounting recess 534*a* on the left of the lower surface 534. The mount 52 on the left end of the body 31 has the mounting recess 534*a* on the right of the lower surface 534.

When the body 31 is attached with the mounts 52, the mounting projection 412 on the body 31 is received in the space defined by the mounting recess 534*a*. More specifically, the mounting projection 411 on the right surface of the second body 312 is received in the mounting recess 534*a* on the mount 52 on the right end of the body 31. The mounting projection 412 on the left surface of the camera housing 314 is received in the mounting recess 534*a* on the mount 52 on the left end of the body 31.

Support 54

Figure 6C:
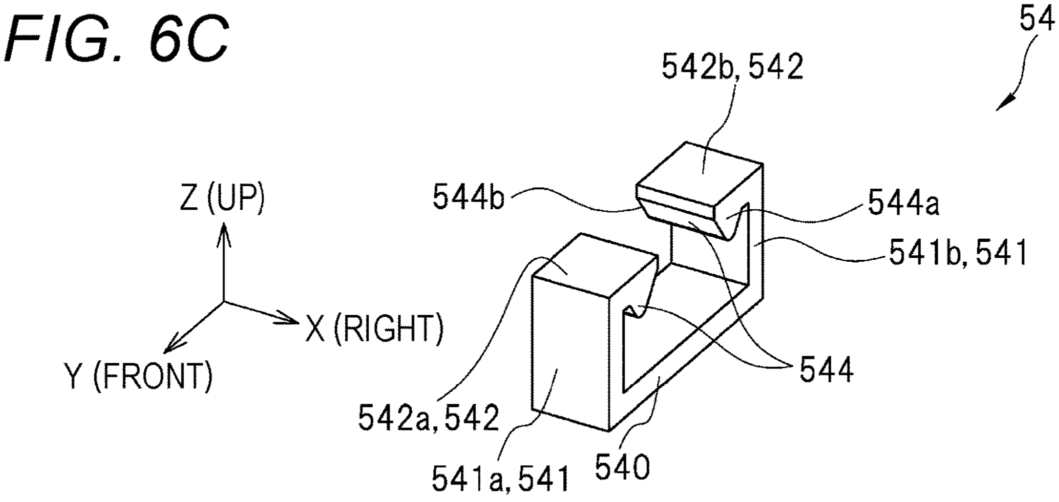
FIG. 6C is an external perspective view of a support.

FIG. 6C is an external perspective view of the support 54. The support 54 includes a support base 540 and movement supports 541*a* and 541*b* (collectively referred to as movement supports 541). The support base 540 extends in the front-rear direction on a plane intersecting with (perpendicular to or substantially perpendicular to) the optical axis K (in Z-direction). The support base 540 has a lower surface fastened to the substrate 11 inside the laptop PC 10, thus fastening the support 54 to the laptop PC 10.

The movement support 541*a* is located at the front end of the support base 540 and extends in the vertical direction. The movement support 541*b* is located at the rear end of the support base 540 and extends in the vertical direction. The movement support 541 extends along the optical axis K (in the vertical direction). The movement support 541 has upper planes 542 at its upper ends.

More specifically, an upper plane 542*a* on the upper end of the movement support 541*a* extends from the upper end of the movement support 541*a* toward the rear in the front-rear direction. An upper plane 542*b* on the upper end of the movement support 541*b* extends from the upper end of the movement support 541*b* toward the front in the front-rear direction. The total length of the movement support 541*a* and the movement support 541*b* in the front-rear direction is shorter than the length of the support base 540 in the front-rear direction. Thus, a space (clearance) is left between the movement support 541*a* and the movement support 541*b* close to the center of the support 54 in the front-rear direction. The movable attachment 53 and the support 54 are positioned to allow the protrusion 531 described above to be received in this clearance. The rear end face of the upper plane 542*a* and the front end face of the upper plane 542*b* are parallel to or substantially parallel to the left-right direction, or the intersecting direction.

Projections 544 protrude downward from the lower surfaces of the upper planes 542, or more specifically, the surfaces facing the support base 540. The base 530 in the movable attachment 53 and the support 54 are positioned to allow the base 530 in the movable attachment 53 to be received in the space (clearance) defined between the lower ends of the projections 544 and the upper surface of the support base 540.

The projections 544 are received in the grooves 533 on the movable attachment 53 described above. More specifically, the projection 544 on the upper plane 542*a* is received in the groove 533 on the front surface 532*a* of the movable attachment 53. The projection 544 on the upper plane 542*b* is received in the groove 533 on the rear surface 532*b* of the movable attachment 53.

The mount 52 with the structure described above allows the movable attachment 53 to move relative to the support 54. More specifically, the movement support 541*a* and the movement support 541*b* facing parallel to each other in the left-right direction (specifically, the intersecting direction) allows the protrusion 531 between the movement support 541*a* and the movement support 541*b* to move in the left-right direction. More specifically, the movement support 541*a* and the movement support 541*b* guide the movement of the protrusion 531 in the left-right direction. The movable attachment 53 thus moves in the intersecting direction. More specifically the movable attachment 53 functions as a movable member that moves in the intersecting direction intersecting with the optical axis K.

As the movable attachment 53 moves in the intersecting direction, the relative positional relationship between the projections 544 on the support 54 and the grooves 533 to receive the projections 544 changes. When the movable attachment 53 moves in the direction indicated by arrow AR1 shown in FIG. 6A, an end 533*a* of the groove 533 comes in contact with an end face 544*a* of the projection 544 to restrict the movable attachment 53 from moving further in the direction indicated by arrow AR1. When the movable attachment 53 moves in the direction indicated by arrow AR2, which is opposite to the direction indicated by arrow AR1, an end 533*b* of the groove 533 comes in contact with an end face 544*b* of the projection 544 to restrict the movable attachment 53 from moving further in the direction indicated by arrow AR2. This structure reduces the likelihood that the movable attachment 53 falls off the support 54 when moving too farther in the intersecting direction.

Attachment and Detachment of Body 31

Referring to FIGS. 5A and 5B, procedures for attaching and detaching the body 31 to and from the mounts 52 will be described. To attach or detach the body 31, each movable attachment 53 moves to one of a first position to cover the corresponding mounting projection 411 or 412 on the body 31 or a second position to uncover the corresponding mounting projection 411 or 412 on the body 31.

A procedure for attaching the body 31 will be described first. The body 31 is placed between the mount 52 on the right and the mount 52 on the left. As shown in FIG. 5B, the movable attachment 53 in the mount 52 on the right is moved rightward from the support 54. More specifically, the movable attachment 53 is moved rightward from the support 54 to a position at which its movement is restricted by the projections 544 and the grooves 533. Similarly, the movable attachment 53 in the mount 52 on the left is moved leftward from the support 54 to a position at which its movement is restricted by the projections 544 and the grooves 533.

In this state, when the protrusion 531 on the mount 52 on the right is operated leftward, the movable attachment 53 moves in the intersecting direction toward the right surface of the body 31. The mounting projection 411 on the right surface of the body 31 is received in the mounting recess 534*a* on the lower surface 534 of the base 530 in the movable attachment 53 that has moved leftward in the intersecting direction.

Similarly, when the protrusion 531 on the mount 52 on the left is operated rightward, the movable attachment 53 moves in the intersecting direction toward the left surface of the body 31. The mounting projection 412 on the left surface of the body 31 is received in the mounting recess 534*a* on the lower surface 534 of the base 530 in the movable attachment 53 that has moved rightward in the intersecting direction. More specifically, the movable attachments 53 in the mounts 52 on the right and left of the body 31 cover the mounting projections 411 and 412 as the second protrusions on the body 31. When each movable attachment 53 moves to the first position to cover the corresponding mounting projection 411 or 412, the body 31 is fastened with the movable attachments 53 in the mounts 52 as shown in FIG. 5A.

A procedure for detaching the body 31 attached in the manner described above will now be described. When the protrusion 531 on the mount 52 on the right is operated rightward in the state shown in FIG. 5A, the movable attachment 53 moves away from the right surface of the body 31 in the intersecting direction. The mounting projection 411 on the right surface of the body 31 that has been received in the mounting recess 534*a* comes out of the mounting recess 534*a*.

Similarly, when the protrusion 531 on the mount 52 on the left is operated leftward, the movable attachment 53 moves away from the left surface of the body 31 in the intersecting direction. The mounting projection 412 on the left surface of the body 31 that has been received in the mounting recess 534*a* comes out of the mounting recess 534*a*. More specifically, the movable attachments 53 in the mounts 52 on the right and left of the body 31 uncover the mounting projections 411 and 412 as the second protrusions on the body 31.

When each movable attachment 53 moves to the second position to uncover the corresponding mounting projection 411 or 412, the body 31 and the mounts 52 are in the state shown in FIG. 5B. More specifically, the body 31 is no longer fastened to the mounts 52 with the movable attachments 53. In this state, the body 31 can be moved upward to be detached.

The second embodiment described above produces the advantageous effects described below, in addition to the advantageous effects (1), (2), and (4) described in the first embodiment.

Each mount 52 includes the movable attachment 53 movable in the direction intersecting with the optical axis K, and the support 54 supporting the movable attachment 53. Each movable attachment 53 moves to one of the first position to cover the corresponding mounting projection 411 or 412 as a second protrusion on the body 31, or to the second position to uncover the corresponding mounting projection 411 or 412. When the movable attachment 53 is at the first position, the body 31 is attached to the mounts 52. This facilitates attachment and detachment of the body 31 in the blade open-close device 30, thus improving workability.

The structure for mounting the body 31 is not limited to the mounts 32 in the first embodiment or the mounts 52 in the second embodiment. The first or second embodiment described above may be modified in the following forms. Like reference numerals denote like components in the first and second embodiments. The modifications will be described focusing on their differences from the first or second embodiment. Unless otherwise specified, the components are the same as in the first or second embodiment.

First Modification

Mounts 32 included in a blade open-close device 30 according to a first modification are, for example, elastic members such as leaf springs. The mounts 32 are fastened to the substrate 11 and extend in the vertical direction. When attached, a body 31 receives, on its side surfaces, forces from the mounts 32. The body 31 in the first modification is thus fastened with the mounts 32 without the projections 41 included in the body 31 in the first embodiment.

Second Modification

Figure 7A:
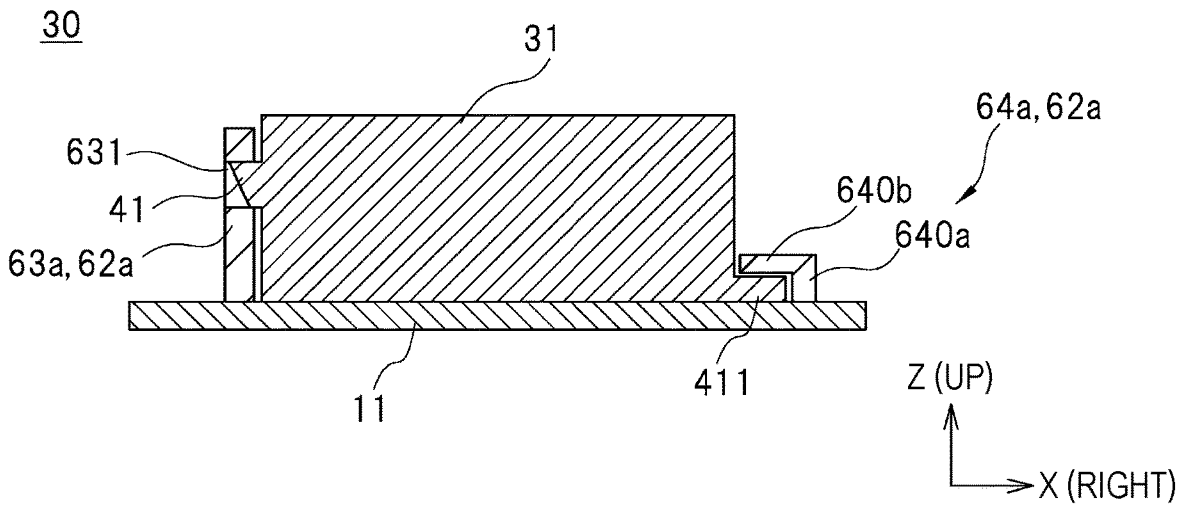
FIG. 7A is a schematic cross-sectional view of a blade open-close device according to a second modification.
Figure 7B:
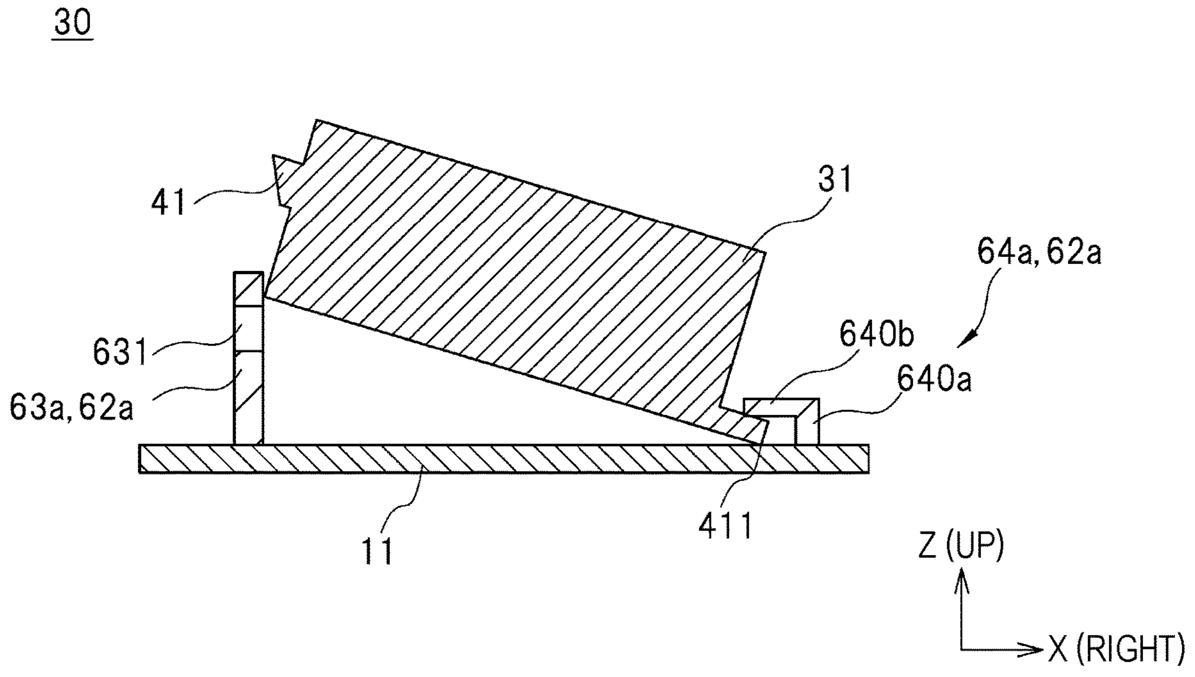
FIG. 7B is a schematic cross-sectional view of the blade open-close device according to the second modification.

FIGS. 7A and 7B are schematic cross-sectional views of a blade open-close device 30 according to a second modification. The blade open-close device 30 according to the second modification includes mounts 62*a*. The mounts 62*a* include a first mount 63*a* and a second mount 64*a*. A body 31 has, on its side surfaces, a projection 41 similar to that in the first embodiment at a position facing the first mount 63*a*, and a mounting projection 411 similar to that in the second embodiment at a position facing the second mount 64*a*.

The first mount 63*a* is similar to the engagement portion 322 included in the mount 32 in the first embodiment. More specifically, the first mount 63*a* is an elastic member such as a leaf spring fastened to the substrate 11, and extends in the vertical direction. The first mount 63*a* is a rectangular frame with a mounting opening 631 similar to the mounting opening 322*a* in the engagement portion 322. When the body 31 is attached to the mount 62*a*, the mounting opening 631 in the first mount 63*a* engages with the projection 41.

The second mount 64*a* is located on the substrate 11. The second mount 64*a* is shaped to cover an upper portion of the mounting projection 411. More specifically, the second mount 64*a* has a wall 640*a* extending upward from the substrate 11 and a cover surface 640*b* parallel to or substantially parallel to the direction intersecting with the vertical direction at the upper end of the wall 640*a*. When the body 31 is attached to the mount 62*a*, the mounting projection 411 is placed and received in a space between the cover surface 640*b* and the substrate 11.

To attach the body 31 to the mount 62*a*, the mounting projection 411 on the body 31 is first placed between the cover surface 640*b* of the second mount 64*a* and the substrate 11 as shown in FIG. 7B. When the mounting projection 411 is placed into the second mount 64*a*, the body 31 is inclined and the projection 41 is located above the first mount 63*a*. When the body 31 is then pushed downward, the projection 41 engages with the mounting opening 631 in the first mount 63*a* as shown in FIG. 7A. The body 31 is thus attached to the mounts 62*a*.

In some embodiments, a projection on the first mounting portion 63*a* may engage with a recess on the body 31, in place of the first mounting portion 63*a* engaging with the projection 41 on the body 31. The first mounting portion 63*a* is not limited to a member similar to the engagement portion 322 in the first embodiment as described above, but may be a member similar to the mount 32 in the first modification. In this structure, a force from the first mounting portion 63*a* acts on the side surface of the body 31, and thus the body 31 includes no projection 41.

Third Modification

A blade open-close device 30 according to a third modification includes, as mounts 32, the structure of the mount 52 in the second embodiment and the structure of the second mount 64*a* in the second modification shown in FIGS. 7A and 7B. More specifically, the mount 52 in the second embodiment is located on the side (right surface) of the body 31 with the mounting projection 411, and the second mount 64*a* in the second modification is located on the side (left surface) of the body 31 with the mounting projection 412. This allows attachment or detachment of the body 31 by moving the movable attachment 53 in the mount 52 to one of the first position or the second position in the intersecting direction as in the second embodiment.

Fourth Modification

Figure 8A:
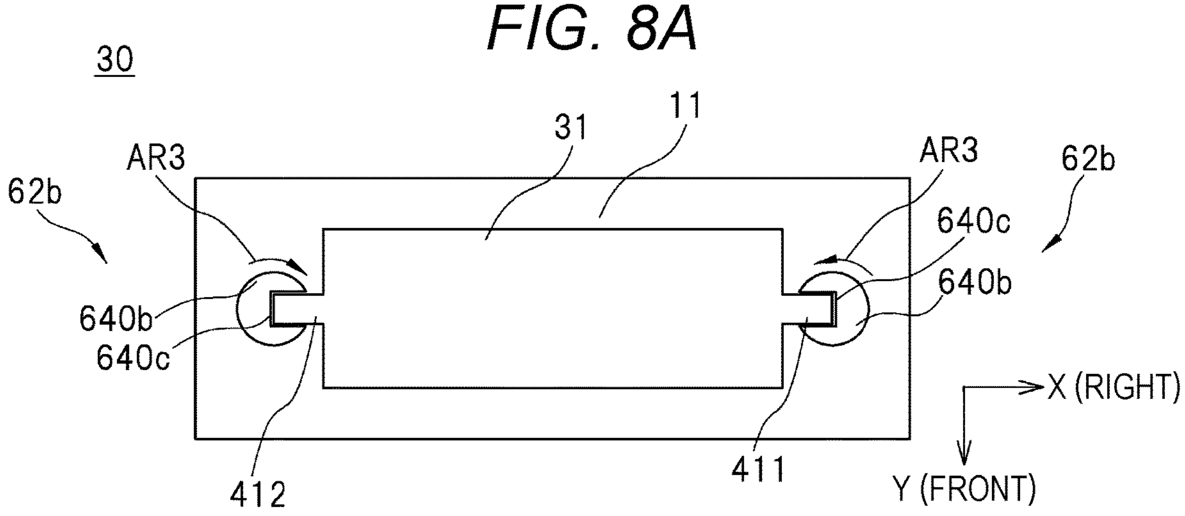
FIG. 8A is a schematic plan view of a blade open-close device according to a fourth modification.
Figure 8B:
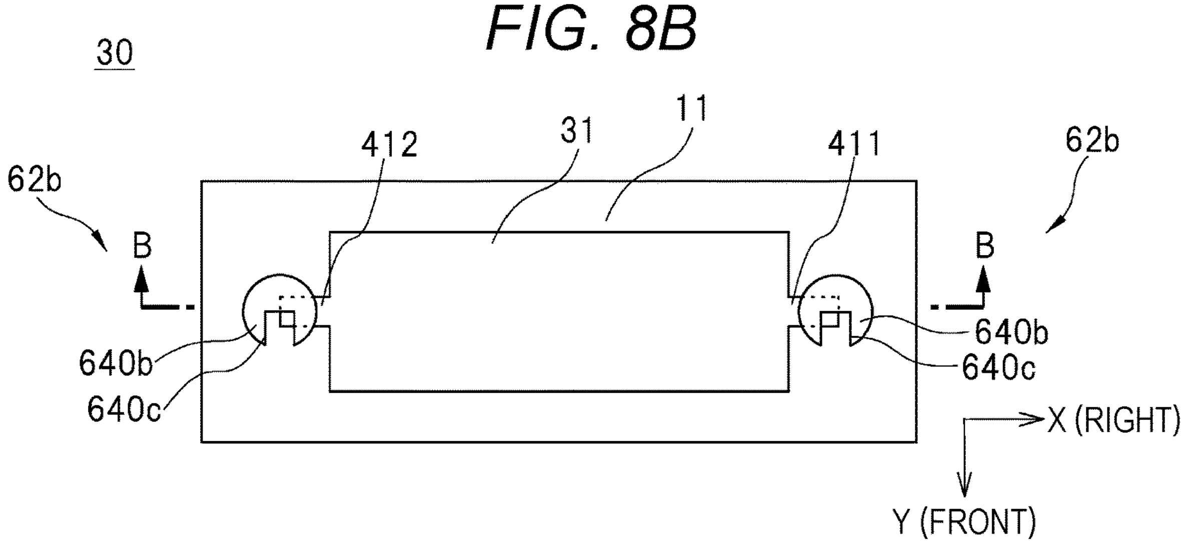
FIG. 8B is a schematic plan view of the blade open-close device according to the fourth modification.
Figure 8C:
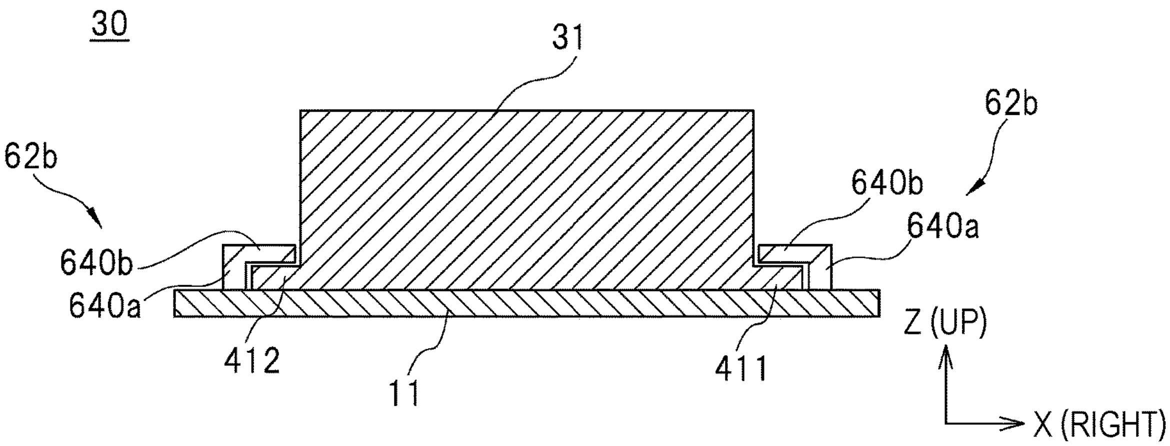
FIG. 8C is a schematic cross-sectional view of the blade open-close device according to the fourth modification.

FIGS. 8A, 8B, and 8C are schematic views of a blade open-close device 30 according to a fourth modification. FIGS. 8A and 8B are plan views of the blade open-close device 30 according to the fourth modification. FIG. 8C is a cross-sectional view of the blade open-close device 30 taken along line B-B in the state shown in FIG. 8B. The body 31 includes mounting projections 411 and 412 similar to those on the body 31 in the second embodiment. The blade open-close device 30 according to the fourth modification includes mounts 62*b* each including, similarly to the second mount 64*a* shown in FIGS. 7A and 7B, a wall 640*a* extending upward from the substrate 11 and a cover surface 640*b* parallel to or substantially parallel to the direction intersecting with the vertical direction at the upper end of the wall 640*a*.

However, the cover surface 640*b* has an opening 640*c* with a shape corresponding to the shape of the mounting projection 411 or 412 on a plane perpendicular to or substantially perpendicular to the optical axis K. The opening 640*c* allows the corresponding mounting projection 411 or 412 on the body 31 that moves in the vertical direction to pass through when the body 31 is placed on or detached from the substrate 11.

Each mount 62*b* is rotatable on the substrate 11 with the rotational axis along the optical axis K intersecting with the substrate 11, or in the vertical direction. The mount 62*b* rotates to switch between a state of the mounting projection 411 or 412 not being received in a space between the cover surface 640*b* and the upper surface of the substrate 11 (first state) and a state of the mounting projection 411 or 412 being received in the space (second state). FIG. 8A schematically shows the mounts 62*b* in the first state. FIGS. 8B and 8C schematically show the mounts 62*b* in the second state. In the first state, the openings 640*c* overlap the mounting projections 411 and 412 in the vertical direction when the body 31 is placed on the substrate 11.

To attach the body 31 to the mounts 62*b*, the mounts 62*b* are first in the first state shown in FIG. 8A. When the body 31 is then moved downward, the mounting projections 411 and 412 pass through the openings 640*c*. When the body 31 is placed on the substrate 11, the mounts 62*b* are rotated in the direction indicated by arrows AR3 on the substrate 11. This causes the openings 640*c* to move away upward from the mounting projections 411 and 412, and the mounts 62*b* to switch to the second state shown in FIGS. 8B and 8C. As shown in FIG. 8C, the mounting projections 411 and 412 on the body 31 are thus received in the spaces between the cover surfaces 640*b* and the upper surface of the substrate 11, and the body 31 is attached to the mounts 62*b*.

The mounts 62*b* are not limited to those with the shape described above. For example, each mount 62*b* includes a rotary shaft mounted on the substrate 11 and extending in the vertical direction, and a pressure member mounted on the rotary shaft in a rotatable manner. The pressure member is, for example, a flat elastic member, such as a leaf spring, and rotates about the rotary shaft. The pressure member is rotated to switch between a state of the pressure member not overlapping the mounting projection 411 or 412 in the vertical direction (first state) and a state of the pressure member overlapping the mounting projection 411 or 412 (second state). In the second state, the upper surfaces of the mounting projections 411 and 412 and the lower surfaces of the pressure members come in contact with each other, and the pressure members press the mounting projections 411 and 412 downward. The body 31 is thus attached to the mounts 62*b*.

The mount 62*b* is not limited to be rotatable about an axis in the vertical direction of the substrate 11. In this case, the mount 62*b* has, for example, a shape similar to the second mount 64*a* in the mount 62*a* in the second modification shown in FIGS. 7A and 7B, and rotates about the rotational axis along the direction (front-rear direction) intersecting with (perpendicular to or substantially perpendicular to) the optical axis K.

When the cover surfaces 640*b* do not face the upper surface of the substrate 11, the cover surfaces 640*b* and the substrate 11 have no space between them. The mounting projections 411 and 412 on the body 31 are thus not received (first state). When the mounts 62*b* are rotated about the rotational axis in this state, the lower surfaces of the cover surfaces 640*b* face the upper surface of the substrate 11. More specifically, the cover surfaces 640*b* and the substrate 11 have spaces between them, in which the mounting projections 411 and 412 are received (second state). The body 31 is thus attached to the mounts 62*b*.

Fifth Modification

A blade open-close device 30 according to a fifth modification includes mounts 32 that are, for example, elastic members such as springs, and are located on the substrate 11. Each mount 32 has one end (lower end) fastened to the substrate 11, and the other end (upper end) being a hook. The mounting projections 411 and 412 on the body 31 are attached to the upper ends of the mounts 32 in a disengageable manner. When the upper ends of the mounts 32 are engaged with the mounting projections 411 and 412, the mounts 32 press the body 31 downward. The body 31 is thus attached to the mounts 32.

Sixth Modification

A blade open-close device 30 according to a sixth modification includes mounts 32 each including a bolt and a nut. The bolt is fastened on the substrate 11 and extends in the vertical direction. The nut is screwed onto the bolt and is movable in the vertical direction in which the bolt extends. The body 31 is placed on the substrate 11 when the nut is above the bolt. The nut is then moved downward along the bolt until the bottom surface of the nut comes in contact with the upper surface of the corresponding mounting projection 411 or 412. The nuts press the mounting projections 411 and 412 from above. The body 31 is thus attached to the mounts 32 in a detachable manner.

Seventh Modification

A blade open-close device 30 according to a seventh modification includes mounts 32 each including a columnar member, an elastic member, and a pressing member. The columnar member is fastened to the substrate 11 and extends in the vertical direction. The elastic member is, for example, a spring that is wound around the outer surface of the columnar member. The elastic member has an upper end fastened to the upper end of the columnar member, and a lower end fastened to the pressure member. The pressure member is, for example, a plate that can move (slide) along the columnar member in the vertical direction. The pressure member fastened to the lower end of the elastic member as described above is then pressed downward by the elastic member.

A force is applied upward against the pressing force from the pressure member. With the pressure member moved upward, the body 31 is placed on the substrate 11. With the upward force to the pressure member released in this state, the pressure member moves downward along the columnar member under the force from the elastic member and then reaches the corresponding mounting projection 411 or 412 on the body 31. The mounting projections 411 and 412 receive downward forces from the elastic members through the pressure members. The body 31 is thus attached to the mounts 32.

Eighth Modification

A blade open-close device 30 according to an eighth modification includes mounts 32 each including a holding portion and an elastic member. The holding portion is fastened to the substrate 11 and extends in the vertical direction. The holding portion holds the elastic member. The elastic member is, for example, a spring or a bearing, and protrudes from the side surface of the holding portion toward the body 31 in the direction intersecting with the vertical direction. Housings are defined on the side surfaces of the body 31. The housings are recesses on the side surfaces of the body 31. When the body 31 is attached to the substrate 11, the elastic members are received in the recesses.

To attach the body 31 to the substrate 11, the body 31 is moved downward in the vertical direction. When the elastic members come in contact with the side surfaces of the body 31 in this movement, the shape of each elastic member deforms toward the holding portion. More specifically, the elastic member protrudes less against the holding portion, allowing the body 31 to move further downward along the holding portion. When the body 31 is moved further downward and the positions of the elastic members are aligned in the vertical direction with the positions of the housings defined on the body 31, the deformed elastic members return to their original shapes and protrude from the side surfaces of the holding portions. The protruding portions of the elastic members are then received in the housings. The body 31 is thus restricted from moving freely in the vertical direction, and is attached to the mounts 32.

The above elastic members may be located on the side surfaces of the body 31, and the above housings may be defined on the holding portions.

Ninth Modification

The electrical connection of the drive 35 is not limited to the connection using the connection terminal 111 shown in FIG. 4.

Figure 9A:
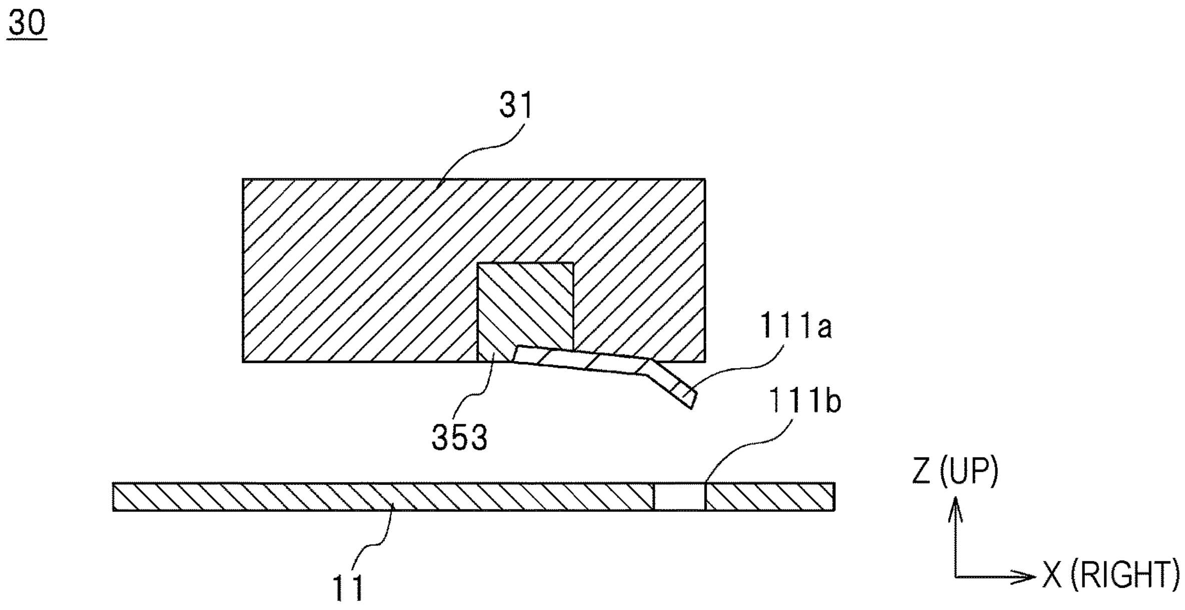
FIG. 9A is a schematic cross-sectional view of a blade open-close device according to a ninth modification.

FIG. 9A is a schematic cross-sectional view of a blade open-close device 30 according to a ninth modification. Unlike the body 31 in the first or second embodiment, a body 31 in the blade open-close device 30 according to the ninth modification includes a connection terminal 111*a* on a lower surface of the body 31, or a surface facing the substrate 11, in place of the fastener 316 to which the terminal plate 350 is fastened. The connection terminal 111*a* is, for example, a spring terminal formed from an elastic material. The connection terminal 111*a* has one end electrically connected to the coil 353.

The substrate 11 has a land 111*b* on its upper surface. The land 111*b* comes in contact with the other end of the above connection terminal 111*a* when the body 31 is attached to the substrate 11. This electrically connects the coil 353 to a device external to the blade open-close device 30, allowing the drive 35 to be energized from the device external to the blade open-close device 30.

Figure 9B:
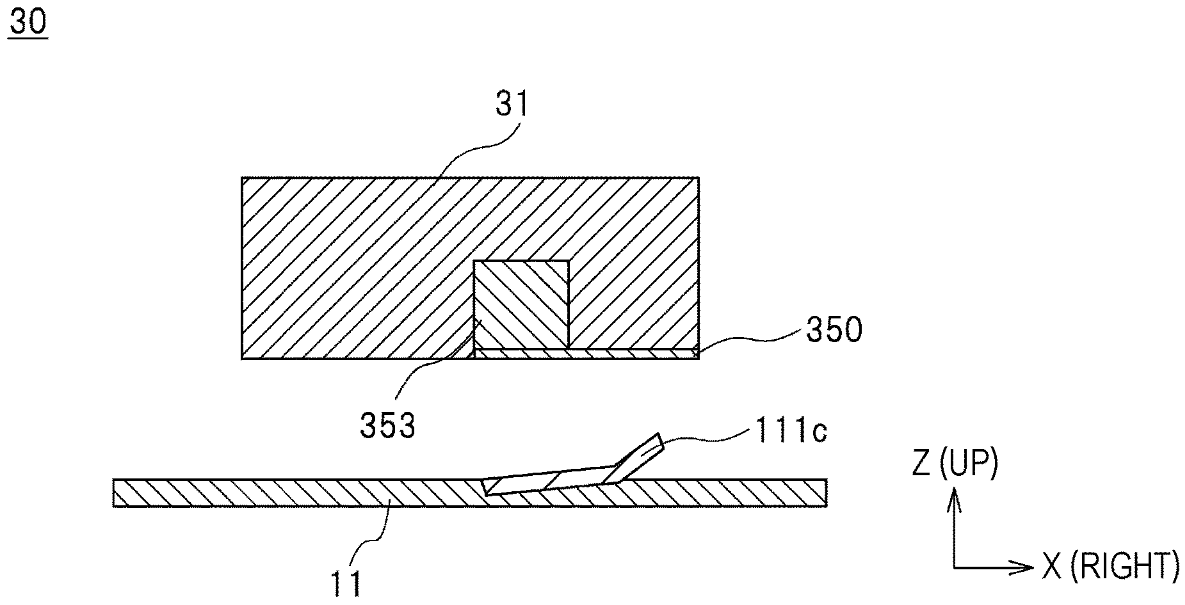
FIG. 9B is a schematic cross-sectional view of the blade open-close device according to the ninth modification.

FIG. 9B is a schematic cross-sectional view of a blade open-close device 30 in another example according to the ninth modification. In this structure, the fastener is located on the lower surface of the body 31, or the surface facing the substrate 11, as in the first or second embodiment. More specifically, the terminal plate 350 is located on the lower surface of the body 31.

A connection terminal 111*c* is located on the substrate 11. The connection terminal 111*c* extends upward at an angle to the upper surface of the substrate 11. The connection terminal 111*c* is, for example, a spring terminal formed from an elastic material. When the body 31 is attached to the substrate 11, a portion of the connection terminal 111*c*, or for example, a portion close to its upper end, comes in contact with the terminal plate 350. More specifically, the coil 353 in the drive 35 is electrically connected to a device external to the blade open-close device 30. This allows the drive 35 to be energized from the device external to the blade open-close device 30.

Although various embodiments and modifications are described above, the present invention is not limited to the embodiments and the modifications. Other forms implementable within the scope of technical idea of the present invention fall within the scope of the present invention.

The structure is not limited to the body 31 including the single camera unit 16. The body 31 may include two or more camera units 16. The camera unit 16 is not limited to a camera unit used for photographing, but may be a camera unit used for authentication or for detecting the operation of various devices such as sensors. The camera unit 16 is not limited to a camera that receives visible light, but may also be an infrared camera that receives infrared light. The body 31 may include a unit including a light emitter that emits light outside, in place of the camera unit 16 that receives incoming external light.

The first housing 310, the second housing 315, and the connector 313 may not be located in the body 31, but may be accommodated in a dedicated member for accommodating the drive 35. The member may then be attached to the body 31.

The technique according to one or more embodiments of the present invention may provide the structure described below.

(1) A blade open-close device, comprising:

an elongated member having an opening on an optical axis of an optical unit and extending in an intersecting direction intersecting with a direction in which the optical axis of the optical unit extends;

a blade on the elongated member, the blade being movable in the intersecting direction to open and close the opening;

a drive configured to move the blade to one of a closed position to close the opening or an open position to open the opening;

a body to which the elongated member, the blade, and the drive are attached; and a mount to which the body is attached in a detachable manner.

(2) The blade open-close device according to (1), further comprising:

a connection terminal electrically connected to the drive, the connection terminal comprising an elastic material.

(3) The blade open-close device according to (1) or (2), wherein the body includes a first protrusion protruding from a side surface of the body in the intersecting direction intersecting with the optical axis, the mount extends along the optical axis, the mount has, in a wall of the mount facing the body, a mounting opening receiving the first protrusion, and the body is attached to the mount with the first protrusion in the mounting opening engaged with the mount.

(4) The blade open-close device according to any one of (1) to (3), wherein the body includes a second protrusion protruding from a side surface of the body in the intersecting direction intersecting with the optical axis, the mount includes a movable member movable in the intersecting direction intersecting with the optical axis and a support supporting the movable member, the movable member is movable in one of a first position to cover the second protrusion or a second position not to cover the second protrusion, and the body is attached to the mount with the movable member at the first position.

(5) The blade open-close device according to any one of (1) to (4), wherein the drive includes a winding, a rotor, and a yoke, and the body includes a winding mount to which the winding is attached, a first housing accommodating the rotor, and a second housing accommodating the yoke.

(6) An electronic device, comprising:

the blade open-close device according to any one of (1) to (5); and a substrate to which the mount included in the blade open-close device is fastened.

What is claimed is:

1. A blade open-close device, comprising:

an elongated member having an opening on an optical axis of an optical unit and extending in an intersecting direction intersecting with a direction in which the optical axis of the optical unit extends;

a blade on the elongated member, the blade being movable in the intersecting direction to open and close the opening;

a drive configured to move the blade to one of a closed position to close the opening or an open position to open the opening;

a body to which the elongated member, the blade, and the drive are attached; and a mount to which the body is attached in a detachable manner, wherein the body includes a first protrusion protruding from a side surface of the body in the intersecting direction intersecting with the optical axis, the mount extends along the optical axis, the mount has, in a wall of the mount facing the body, a mounting opening receiving the first protrusion, and the body is attached to the mount with the first protrusion in the mounting opening engaged with the mount.

2. The blade open-close device according to claim 1, further comprising:

a connection terminal electrically connected to the drive, the connection terminal comprising an elastic material.

3. The blade open-close device according to claim 1, wherein the drive includes a winding, a rotor, and a yoke, and the body includes a winding mount to which the winding is attached, a first housing accommodating the rotor, and a second housing accommodating the yoke.

4. An electronic device, comprising:

the blade open-close device according to claim 1; and a substrate to which the mount included in the blade open-close device is fastened.

5. A blade open-close device, comprising:

an elongated member having an opening on an optical axis of an optical unit and extending in an intersecting direction intersecting with a direction in which the optical axis of the optical unit extends;

a blade on the elongated member, the blade being movable in the intersecting direction to open and close the opening;

a drive configured to move the blade to one of a closed position to close the opening or an open position to open the opening;

a body to which the elongated member, the blade, and the drive are attached; and a mount to which the body is attached in a detachable manner, wherein the body includes a second protrusion protruding from a side surface of the body in the intersecting direction intersecting with the optical axis, the mount includes a movable member movable in the intersecting direction intersecting with the optical axis and a support supporting the movable member, the movable member is movable in one of a first position to cover the second protrusion or a second position not to cover the second protrusion, and the body is attached to the mount with the movable member at the first position.

* * * * *